Aug. 20, 1940. I. H. WILSEY Re. 21,538

GAME APPARATUS

Original Filed Sept. 14, 1936 2 Sheets-Sheet 1

INVENTOR.
Irven H. Wilsey
BY
Clarence E. Threedy
HIS ATTORNEY.

GAME APPARATUS

Original Filed Sept. 14, 1936 2 Sheets-Sheet 2

INVENTOR.
Irven H. Wilsey
BY Clarence E. Threedy
HIS ATTORNEY.

Reissued Aug. 20, 1940

Re. 21,538

UNITED STATES PATENT OFFICE 21,538

GAME APPARATUS

Irven H. Wilsey, Chicago, Ill., assignor of forty-five per cent to John H. Sharp and ten per cent to E. W. Hibbard, both of Chicago, Ill.

Original No. 2,167,703, dated August 1, 1939, Serial No. 100,657, September 14, 1936. Application for reissue May 6, 1940, Serial No. 333,690

14 Claims. (Cl. 273—129)

This invention relates to amusement apparatus of the type having an inclined ball playing board with scoring openings or areas therein, and means for projecting balls out upon the board toward the scoring areas.

A particular object of the invention is the provision of a novel projecting mechanism adapted to impart two degrees of motion to the projected ball or element.

Another object is to provide means for imparting to a ball an initial spinning motion together with means operable at will to release the ball from operative relation with the spinning means for movement along the surface of a game board.

Other novel structural and functional objects residing in the invention will appear in view of the following detailed description and taken with the annexed drawings, in which:

Fig. 6 is a vertical front detail partially in section, taken along lines 6—6 of Fig. 3; while

In the operation of apparatus of the type generally known as ball and pin games as heretofore devised, a ball is adapted to be positioned before a manually operable plunger which is released for impact with the ball to impart a substantially linear velocity thereto and send the latter out over the playing board to encounter various hazards and scoring elements thereon.

The present invention provides a manually operable projecting means which not only imparts a linear velocity to the ball, but also gives the ball a positive gyrating or spinning movement which results in novel motion effects of the ball, as it moves out upon the playing board, in particulars which will be hereinafter pointed out.

Figure 1:
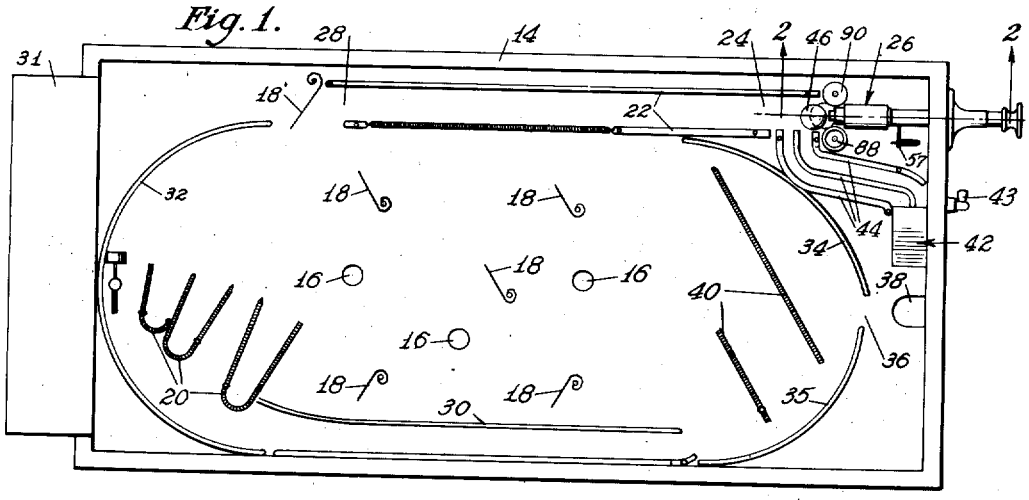
Fig. 1 is a top plan view of a complete game apparatus incorporating my novel projecting mechanism.

A game apparatus including the provisions of my invention is generally shown in Fig. 1, and has a horizontal playing board 12 set in a suitable frame member 14, the vertical walls of which project upwardly a suitable distance above the surface of the board 12, and having a desired number of scoring openings 16 communicating with the underside of the panel or board through which skillfully played balls may pass in scoring movement.

In addition, the playing surface of the board 12 is provided with barriers or hazards 18 variously positioned thereon, and other barriers in the form of U-shaped rails 20 positioned in accordance with a desired game pattern.

At one side of the board 12 are a pair of parallel guide rails 22 having a lower extremity 24 positioned before the novel ball projecting mechanism generally indicated at 26, and an upper or exit extremity 28 before which is disposed at an angle a barrier 18′ adapted to direct a ball impinging thereagainst out upon the board 12 in the general direction of barriers 20 and 18, and on the opposite side of the board to runway rails 22 is a longitudinal guide rail 30.

The upper and lower extremities of the board, which is preferably tilted (downwardly from the left-hand to the right-hand extremities of the board in Fig. 1), are provided with respectively curved guide rails 32 and a pair of rails 34 and 35 between which is an opening 36 positioned before a ball exit 38 at the lowermost extremity of the board. In the embodiment shown a pair of barrier rails 40, one short and one long, may be extended in parallel angularly across the board relative to the opening 36.

A suitable ball elevating mechanism 42 is positioned at the lowermost end of the board 12 adjacent the exit 38 and is adapted, by operation of the handle 43 to elevate balls from the undermost region of the playing board 12 onto delivery rails 44 disposed to deliver a ball 46 into position before the projecting mechanism 26.

Figure 2:
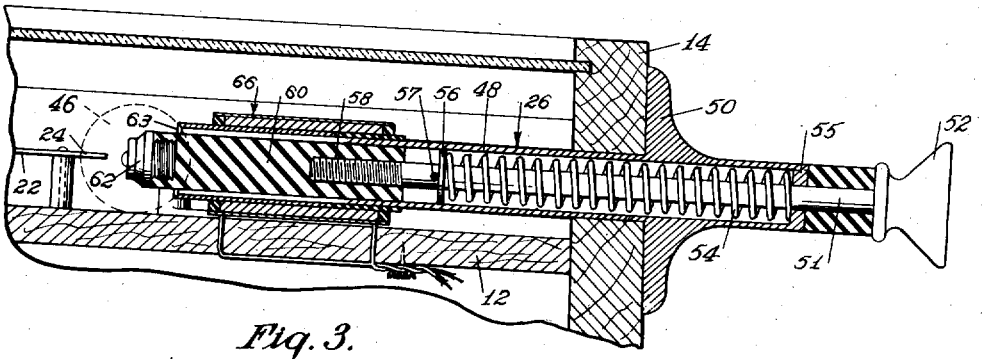
Fig. 2 is a vertical sectional detail of the projecting mechanism taken in the direction of lines 2—2 of Fig. 1.
Figure 3:
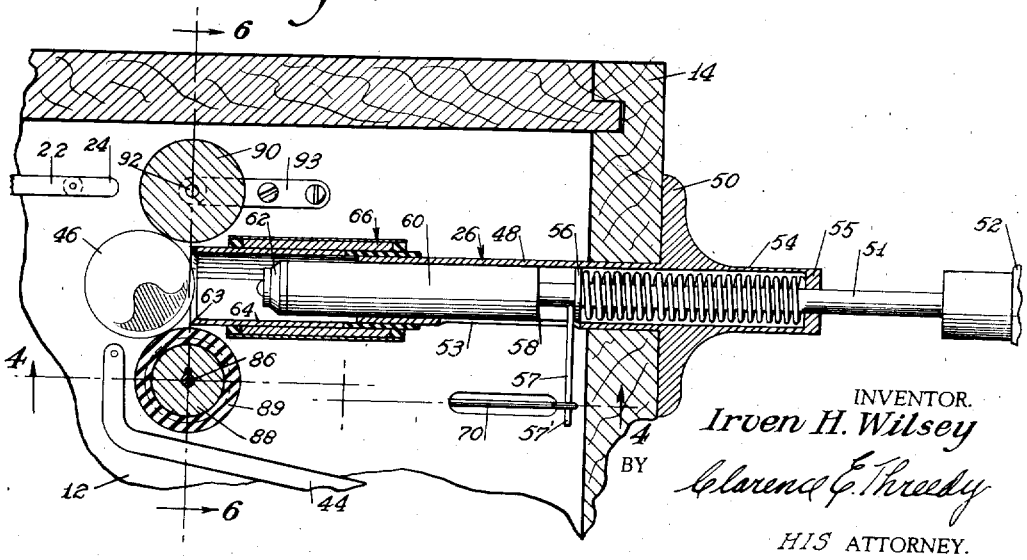
Fig. 3 is a horizontal sectional detail of the projecting mechanism.

The novel projecting device 26 as shown in Figs. 1 to 3 comprises a tubular support 48 having a mounting collar 50 at its outer extremity, adapted to bear against a wall of the cabinet 14 to mount the mechanism thereon, and a plunger rod 51 having a handle 52 at its outermost end slidable within the tube 48 and including a compressible spring 54, one extremity of which bears against the outer end wall 55 of the tube 48 and the other end of which bears against a washer 56 restrained by pin 57 in the rod 51.

Suitably threaded upon the innermost extremity of the plunger rod 51 as at 58, is a cylindrical plunger head 60 adapted to slide within the tubular member 48 and having threaded into its outermost extremity an impact tip or head 62. The plunger head 60 is preferably formed of a non-conductive and non-magnetic substance such as wood or Bakelite, while the impact tip is formed of metal.

Figure 4:
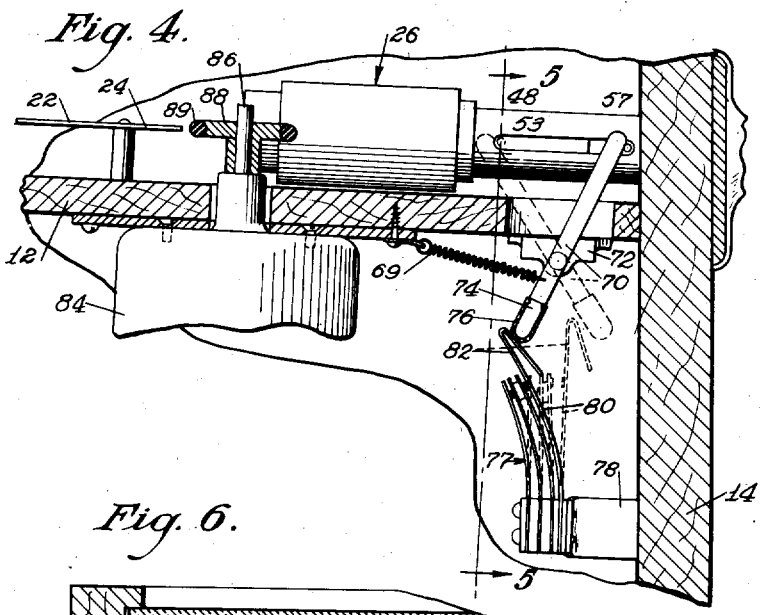
Fig. 4 is a side view of the projecting mechanism.
Figure 5:
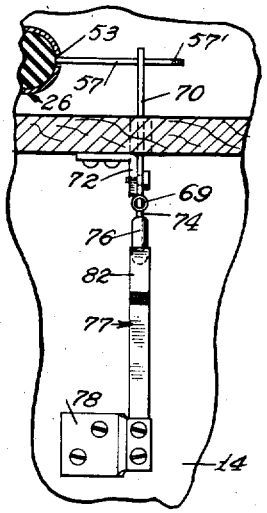
Fig. 5 is a vertical front detail of the control switch, and taken in the direction of lines 5—5 of Fig. 4.

As particularly shown in Figs. 1, 4, and 5, the pin 57 on plunger rod 51 extends normally to the rod out through a longitudinal slot 53 in the side of tube 48 with its outermost extremity 57' adapted to engage a switch arm 70 pivoted upon a bracket 72 with its lowermost extremity 74 extended through an opening in the board 12 and provided with an insulated cap member 76.

A switch 77 of the spring leaf type is mounted by a bracket 78 against the front wall of the cabinet 14 and has a master spring 80 with an end portion 82 positioned in the path of the insulated head or cap 76 of the switch arm 70 for switch operating movement thereby when the arm 70 is moved by the pin 57 responsive to a manipulation of the plunger rod 51.

Figure 6:
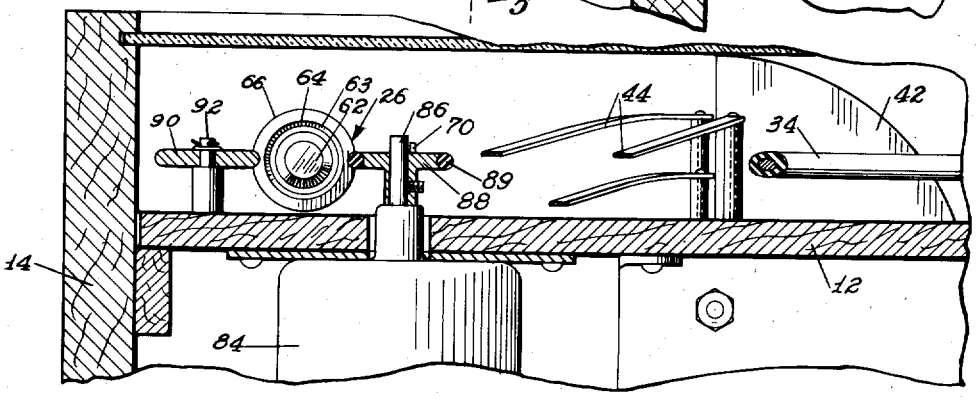

Mounted upon the underside of the board 12 adjacent the plunger mechanism 26 is a motor 84 having its shaft 86 extended upwardly through the board for engagement with a ball rotating wheel 88 having a suitable frictional tire or rim 89 (Figs. 3, 4, and 6). An idler wheel 90 rotatable about a collared pivot 92 is extended by a bracket 93 upwardly from the surface 12 on the opposite side of the magnetic plunger tube 64 to the wheel 88, at a distance therefrom suitable to receive a metal ball 46 so that its innermost (right-hand) extremity will be substantially in confrontation with the beveled extremity 63 of the magnetic tube 64 for attraction by the latter firmly against the peripheries of the two wheels when the solenoid 66 is energized.

Figure 7:
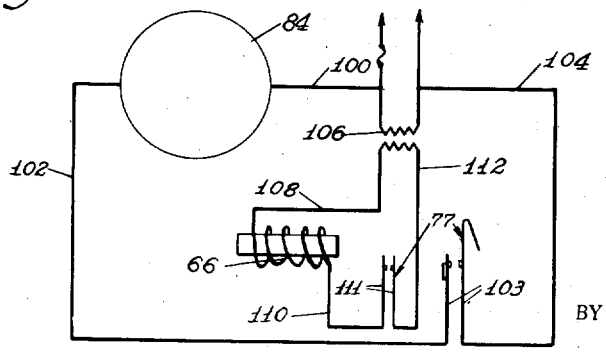
Fig. 7 is a form of circuit diagram for the apparatus.

As shown in Fig. 7, motor 84 is in circuit with a source of power through conductors 100, 102, a pair of contact springs 103 of switch 77, and by conductor 104 returning to the source of power.

The solenoid 66 is desirably energized through a transformer 106, the primary of which is connected to the same source of power as motor circuit 84, and the secondary of which is connected by conductor 108 to one side of the solenoid through the other side of the solenoid winding by conductor 110 to another pair of contact springs 111 of switch 77, returning to the secondary of the transformer by conductor 112.

The switch arm 70 is normally urged in a clockwise direction (Fig. 4) by a spring 69 anchored suitably to wall 12 so as to engage the master spring 82 and flex the several springs of the switch 77 into closed circuit relation. However, extremity 57' of the pin 57 on normally positioned plunger rod 51 engages the upper extremity of the switch arm 70 and pivots the latter (counter-clockwise) into the dotted line position of Fig. 4, leaving the switch 77 in open circuit condition, but when the plunger 51 is retracted preparatory to projecting a ball, the switch 77 will be appropriately operated to energize the motor 84 and solenoid winding 66 in a manner to be particularly described hereafter.

The operation of the device, explained with reference conveniently to the several figures beginning with Fig. 1, is such that the operator may release the machine for use by operation of any desired kind of coin control slide or mechanism (not shown) and by manipulating the handle 43 of the ball elevating mechanism 42 (a type of which is shown in United States Patent No. 2,012,519 to one Radtke) and cause a ball 46 to descend over rails 44 into position before the tip 62 of the projecting mechanism 26.

The ball 46 is preferably a solid sphere of magnetic material such as iron, and in its position before the tip 62 it is spaced away from the rims of the driving wheel 86 and the idler wheel 90. The operator by grasping handle 52 may retract the plunger 51 against the tension of spring 54 in tube 48, thereby drawing the plunger head 60 and the plunger tip 62 within the tube so that the tip 62 will expose the beveled end portion of the magnetic tube 64 for attraction of the ball 46, the latter having meanwhile moved backwardly against the rims of wheels 88 and 90 (Fig. 3), upon withdrawal of tip 62.

As the plunger rod 51 is retracted, the extremity 57' of pin 57 will likewise be retracted and the lever 70 under urgence of its spring 69 will cause the lower end of the lever with the insulated head 76 to move from right to left (Fig. 4) and engage the master spring 82 of switch 77, thereby closing the several contact springs of the latter and closing circuits for both the motor 84 and the solenoid winding 66 (Fig. 7).

The energization of solenoid 66 magnetizes the tube 64, which in turn attracts the metal ball 46 toward the beveled extremity 63 and thus draws the ball against the two wheels 86 and 90. The motor 84 meanwhile has also been energized to drive wheel 86 in a counterclockwise direction, as shown in Fig. 3, so that the frictional rim or tire 89 of wheel 88 transmits the rotary motion thereof to the ball 46 and sets the latter spinning rapidly about a substantially vertical axis, as seen in Fig. 3, the idler wheel 90 serving merely to maintain the ball in suitable position relative to the driving wheel 86 and magnetic tube 64 until the ball has been given adequate rotary velocity.

Having suitably retracted the plunger rod 51, and being satisfied with the degree of momentum imparted to the ball 46, the operator may then release the plunger handle 52 so that compressed spring 54 will drive the plunger head and tip 62 thereof forwardly to strike ball 46 sharply and send it upwardly through the raceway between rails 22, the lever arm 70 meanwhile having been returned to its normal (dotted line) position as shown in Fig. 4 to open the circuits of switch 77 and deenergize the motor 84 and solenoid winding 66, thus freeing the ball 46 of the attraction of magnetic tube 64.

It will be observed that at the instant of impact of tip 62 with the ball 46 when it is positioned against the wheels 86 and 90, two degrees of motion are supplied to the ball, namely, a velocity in a linear direction, and a gyratory or spinning motion about a substantially vertical axis. The linear velocity of the ball carries it upwardly in the raceway to impinge against the baffle or rail 18' and thus deflect it out upon the board in the general direction of the U-shaped rails 20 or the several hazards 18 on the board 12. This latter motion resembles substantially the motion of the ordinary projected ball, it being emphasized, however, that the ball is meanwhile continuing to rotate about its own axis.

The ball will descend over the board 12 toward the lowermost (right-hand extremity thereof) to encounter one or another of the hazards 16, 18 or 40.

Should the ball find its way to the lowermost end of the playing field and encounter either of the rails 34 or 35, it will apparently become suddenly energized and be shot out with increased velocity toward the upper end of the board where it may again encounter any of the scoring openings 16 or barriers 18 as before described. This latter behavior of the ball is one of the important features of the invention, and is the result of the gyratory or spinning motion of the ball at the instant it encounters the barriers 34 and 35.

This sudden apparent re-energization of the ball follows only upon impact thereof with rails such as 34 and 35, the latter being especially provided with a suitable frictional covering such as rubber (see Fig. 6), so that the ball will tend to move away therefrom with a degree of rapidity and violence depending in part upon the momentum or speed of rotation of the ball.

It will be apparent that other barriers 18 or the rail 30, for example, might similarly be provided with friction surfaces to produce various and sudden changes in the direction and speed of movement of the ball in the manner just described, and I do not limit myself to the particular arrangement of the rails 34 and 35 herein shown for illustrative purposes.

Should the ball not encounter rails such as 34 and 35 for reprojection upon the board, it will pass through the exit openings 36 and 38 to be directed into the receiving members of the elevating mechanism 42 for subsequent use, and such other balls as find their way into the scoring pockets 16 may indicate the score in any usual manner and operate, for instance, a score counting mechanism generally indicated at 31.

It will be apparent that my novel projecting mechanism, together with the disposition and construction of the special rails such as 34 and 35, which for convenience I may term reprojecting rails or members, will be susceptible of various modifications and rearrangements, and I therefore do not desire to be restricted to the precise structure or function of the embodiment herein set forth in detail for purposes of description and illustration, but rather I wish to avail myself of all modifications, variations and combinations of the disclosure coming within the scope of the appended claims, which I desire to protect by Letters Patent of the United States.

I claim:

1. Ball projecting means for use with game devices of the type having ball playing surfaces and means for projecting balls thereon, said projecting means comprising a manually controlled spring driven plunger having a sleeve-like magnetic device adjacent the projecting extremity thereof and adapted to attract a paramagnetic ball thereto, said plunger having a driving head retractable within said magnetic member against spring means and releasable for driving by said spring means to impact said ball and project it onto said surface, and a motor driven rotatable member positioned adjacent said magnetic member and adapted to rotate said ball attracted by said magnetic member when the said driving head is retracted within said last mentioned member.

2. Ball projecting means for use with game apparatus and the like and comprising a reciprocable spring driven plunger adapted to be manually retracted and released to strike and project a ball projectile, means including a member having a substantially flat contact surface for supporting a ball in position before said plunger, spaced rotatable means adjacent the striking end of said plunger for holding a ball in spaced relation relative to said end, electrical means for spinning one of said rotatable members, and electromagnetic means near said end of the plunger and adapted when energized to attract a paramagnetic ball and hold the same against said rotatable means so that said ball will be spun, together with switch means controlled by said plunger when the latter is retracted for energizing said electrical spining means and said electromagnetic attracting means.

3. Ball projecting means for use with game apparatus and the like including a ball playing field, said projecting means including a manually actuated projector operable to strike and project a ball for movement onto said playing field, electrically driven means adjacent said projector for spinning a ball positioned to be struck by said projector, electrically operable means for urging and holding said ball into operative engagement with said first-mentioned electrically driven means for spinning said ball, together with switching mechanism operable by said projector when the same is manually actuated for energizing and deenergizing the electrically driven and electrically operable means automatically by manual actuation of the projector whereby said ball may be set to spinning rapidly before or substantially at the time said projector strikes the ball for projection onto the playing field as aforesaid.

4. Ball projecting means for use with game apparatus and the like including a ball playing field, said projecting means including a manually actuated projector operable to strike and project a ball for movement onto said playing field, electrically driven means adjacent said projector for spinning a ball positioned to be struck by said projector, electrically operable means for urging and holding said ball into operative engagement with said first-mentioned electrically driven means for spinning said ball, together with switching mechanism operable by said projector when the same is manually actuated for energizing and deenergizing the electrically driven and electrically operable means automatically by manual actuation of the projector whereby said ball may be set to spinning rapidly before or substantially at the time said projector strikes the ball for projection onto the playing field as aforesaid, said second-mentioned electrically operable means for urging the ball into operative engagement with the spinning means releasing its influence on said ball before or substantially at the moment when said projector strikes the ball.

5. In a device of the class described, a ball projector including a projecting plunger, means for positioning a ball in position to be struck by said plunger, power-driven means arranged for engagement by a ball positioned as aforesaid for imparting a spinning motion to said ball, and control mechanism coacting with said plunger for energizing and deenergizing said power-driven means.

6. In a device of the class described, ball projecting means including a projecting plunger, means for positioning a ball at the striking head of said plunger, motor driven ball spinning means arranged near said head of the plunger for engagement by a ball positioned as aforesaid and adapted to spin said ball, switch means arranged to control said motor driven means by manipulation of said plunger whereby to give said ball a spinning motion substantially at or prior to the time the ball is struck by the plunger.

7. In a device of the class described, ball projecting mechanism including a projecting plunger, means for positioning a magnetically attractable ball to be struck by said plunger when the same is operated, electrically actuated ball spinning means arranged adjacent said plunger for engagement by a ball positioned as aforesaid, electromagnetic means arranged adjacent said plunger for attracting said ball into driving engagement with said spinning means, and switch means arranged to be operated by said plunger to energize said spinning means and ball attracting means when the plunger is operated to project the ball, whereby said ball may be given a rapid spinning movement substantially prior to or at the time it is projected.

8. In a device of the class described, the combination with means actuatable to strike a ball a blow for projecting the same, and means for positioning the ball to be struck by the first mentioned means, of power-driven means arranged for engagement by the ball positioned as aforesaid for imparting an initial spinning motion to said ball.

9. In a device of the type described, the combination with means for receiving a ball and imparting to it a spinning motion about an axis of the ball, of means operable at will to release the ball from the first-mentioned means, when the ball has achieved a desired degree of momentum, for movement across the surface of a game board or the like.

10. The combination with a rotatable member and an electric driving motor for rotating the same, of means releasable at will for holding a ball in operative relation with said member to impart to the ball a gyratory spinning motion about an axis thereof.

11. The combination with a rotatable disk and an electric driving motor therefor, of means for retaining a ball in frictional engagement with said disk, said retaining means receiving the ball sufficiently loosely to permit substantially free rotation of the ball about an axis thereof due to the ball's frictional engagement with the disk.

12. The combination with a rotatable member, of power actuated means for rotating said member, means for retaining a ball in position to be engaged by said member and spun about an axis of the ball upon rotation of said member, and control means for starting and stopping rotation of said member.

13. In a device of the type described for causing a paramagnetic ball to move across a game board surface, the combination of means including an electric driving motor for imparting an initial spin to the ball about an axis of the latter, and means including an electromagnet for releasably retaining the ball in operative relation with said first-mentioned means prior to the release of the ball for movement across the game board surface.

14. In a device of the type described for causing a paramagnetic ball to move across a game board surface, the combination of means including an electric driving motor for imparting an initial spin to the ball about an axis of the latter, means including an electromagnet for releasably retaining the ball in operative relation with said first-mentioned means prior to the release of the ball for movement across the game board surface, and switching means operable at will to deenergize said motor and electromagnet substantially simultaneously to release the ball.

IRVEN H. WILSEY.